United States Patent
Takamiya et al.

(10) Patent No.: US 9,151,875 B2
(45) Date of Patent: Oct. 6, 2015

(54) OPTICAL FILM AND TOUCH PANEL

(75) Inventors: Hiroyuki Takamiya, Tokyo-to (JP);
Kenji Ueno, Tokyo-to (JP); Seika Minakoshi, Tokyo-to (JP)

(73) Assignee: DAI NIPPON PRINTING CO., LTD., Tokyo-to (JP)

( * ) Notice: Subject to any disclaimer, the term of this patent is extended or adjusted under 35 U.S.C. 154(b) by 614 days.

(21) Appl. No.: 13/510,087

(22) PCT Filed: Nov. 29, 2010

(86) PCT No.: PCT/JP2010/071255
§ 371 (c)(1),
(2), (4) Date: May 16, 2012

(87) PCT Pub. No.: WO2011/065531
PCT Pub. Date: Jun. 3, 2011

(65) Prior Publication Data
US 2012/0229423 A1    Sep. 13, 2012

(30) Foreign Application Priority Data
Nov. 30, 2009    (JP) .................. 2009-271635

(51) Int. Cl.
*G02B 1/10*    (2015.01)
*G02B 5/02*    (2006.01)
*G02F 1/1333*    (2006.01)
*G02F 1/1335*    (2006.01)
*G02F 1/13363*    (2006.01)

(52) U.S. Cl.
CPC .............. *G02B 1/105* (2013.01); *G02B 5/0221* (2013.01); *G02F 1/13338* (2013.01); *G02F 1/133528* (2013.01); *G02F 2001/133638* (2013.01); *Y10T 428/25* (2015.01)

(58) Field of Classification Search
CPC ...................... G02B 1/10–1/111; G02B 1/118
See application file for complete search history.

(56) References Cited

U.S. PATENT DOCUMENTS

| | | | |
|---|---|---|---|
| 2003/0072891 A1* | 4/2003 | Murakami et al. | 427/569 |
| 2004/0071986 A1 | 4/2004 | Shoshi et al. | |
| 2006/0013967 A1 | 1/2006 | Mikoshiba et al. | |
| 2007/0195431 A1* | 8/2007 | Asakura et al. | 359/707 |
| 2009/0202819 A1 | 8/2009 | Asahi et al. | |

FOREIGN PATENT DOCUMENTS

| | | | |
|---|---|---|---|
| JP | 05127822 A | * | 5/1993 |
| JP | 11-034243 A | | 2/1999 |
| JP | 2004-082613 A | | 3/2004 |

(Continued)

OTHER PUBLICATIONS

International Search Report: mailed Dec. 28, 2010; PCT/JP2010/071255.

*Primary Examiner* — Elizabeth A Robinson
(74) *Attorney, Agent, or Firm* — Ladas & Parry LLP

(57) ABSTRACT

A touch panel which prevents Newton ring formation and glare, shows high transmission image clarity, prevents haze and has high visibility, and an optical film which is applicable to such a touch panel. An optical film comprising an optically-transparent substrate and at least one hard coat layer (A) disposed on a surface of the optically-transparent substrate, wherein a surface of the hard coat layer (A), which is opposite to a surface where the optically-transparent substrate is present, has an arithmetic mean roughness (Ra) defined in JIS B0601 (1994) of 0.025 to 0.05 μm, and has 10 to 250 convex portions each having a height of 0.3 to 3 μm in a 1.08 mm square area.

7 Claims, 6 Drawing Sheets

(56) References Cited

FOREIGN PATENT DOCUMENTS

| JP | 2007-265100 A | 10/2007 |
| JP | 2008-165040 A | 7/2008 |
| JP | 2008-257041 A | 10/2008 |
| JP | 2008257041 A * | 10/2008 |
| JP | 2009-116336 A | 5/2009 |
| JP | 2009-217258 A | 9/2009 |
| JP | 2009-226932 A | 10/2009 |
| JP | 2009-265341 A | 11/2009 |
| WO | 2004/057381 A1 | 7/2004 |

* cited by examiner

OPTICAL FILM AND TOUCH PANEL

TECHNICAL FIELD

The present invention relates to an optical film for being disposed on the front face of a display (image display device) such as a liquid crystal display (LCD), a cathode ray tube display device (CRT), an organic electroluminescence display (organic EL) or a plasma display (PDP), and a touch panel using the same.

BACKGROUND ART

In the display as described above, it is required that the image display surface of the display is imparted with hardness to avoid being scratched upon handling. To meet the request, in general, an optical film comprising a hard coat (HC) layer provided on a substrate film is used to impart hardness to the image display surface of the display (Patent Literature 1).

As shown in FIG. 1, a general touch panel comprises, for example, two optically-transparent substrates 10 and 11 each provided with Indium Tin Oxide (ITO) being transparent electroconductive films 20 and 21 (hereinafter, transparent electroconductive film 21 on a display side may be referred to as "second transparent electroconductive film" to be distinguished from transparent electroconductive film 20), which are disposed so that transparent electroconductive films 20 and 21 are faced each other via spacers 30. On the input operation side-surface of optically-transparent substrate 10, hard coat layer 40 for imparting hardness and abrasion resistance is provided. Display 80 is disposed on the surface side of optically-transparent substrate 11, which is opposite to the surface side where transparent electroconductive film 21 is present. Then, hard coat layer 40, optically-transparent substrate 10 and transparent electroconductive film 20, which are located closer to the input operation side than spacers 30 of touch panel 150, are pressed with a finger, stylus pen 70 or the like to input information, and the pressed part of input operation side-transparent electroconductive film 20 is brought into contact with display 80 side-second transparent electroconductive film 21. Thus, positional information is detected.

At this time, in the part where the transparent electroconductive films are contacted by the input operation and the vicinity thereof, light reflected from surface 50 on the display side of transparent electroconductive film 20 interferes with light reflected from surface 60 on the input operation side of second transparent electroconductive film 21. Therefore, there has been a problem that interference fringes called "Newton ring" occur, thus, visibility of the display decreases.

In response to the above problem, in Patent Literature 2, there has been proposed a touch panel comprising one or both of electroconductive films on an anti-Newton ring layer having an arithmetic mean roughness (Ra) of 0.07 to 0.3 μm and maximum height (Ry) of 1.5 to 2.0 μm in order to prevent Newton ring formation.

However, there has been a problem that the touch panel having a large Ra as proposed in Patent Literature 2 has glare when disposed on the front surface (input operation side) of the display, and visibility decreases due to the glare.

CITATION LIST

Patent Literature

[Patent Literature 1] Japanese Patent Application Laid-Open (JP-A) No. 2008-165040
[Patent Literature 2] JP-A No. 2007-265100

SUMMARY OF INVENTION

Technical Problem

In order to solve the above problems, an object of the present invention is to provide a touch panel which prevents Newton ring formation and glare, shows high transmission image clarity, prevents haze and has high visibility, and an optical film which is applicable to such a touch panel.

Solution to Problem

As a result of diligent researches, the inventors of the present invention have found out that a touch panel which prevents Newton ring formation and glare, shows high transmission image clarity, prevents haze and has high visibility can be obtained by using an optical film instead of substrate film 10 in FIG. 1, the optical film comprising a substrate film and a hard coat layer disposed on a surface of the substrate film, the hard coat layer having an arithmetic mean roughness (Ra) of 0.025 to 0.05 μm and 10 to 250 convex portions each having a height of 0.3 to 3 μm in a predetermined area, and by providing a transparent electroconductive film on a surface having the specific shape of the hard coat layer. Thus, the inventors have achieved the present invention.

That is, the optical film of the present invention is an optical film comprising an optically-transparent substrate and at least one hard coat layer (A) disposed on a surface of the optically-transparent substrate, wherein a surface of the hard coat layer (A), which is opposite to a surface where the optically-transparent substrate is present, has an arithmetic mean roughness (Ra) defined in JIS B0601 (1994) of 0.025 to 0.05 μm, and has 10 to 250 convex portions each having a height of 0.3 to 3 μm in a 1.08 mm square area.

By forming the arithmetic mean roughness and convex portions on the surface of the hard coat layer (A), which is opposite to the surface where the optically-transparent substrate is present, Newton ring formation and glare can be prevented.

In the optical film of the present invention, it is preferable that when the area is uniformly divided into 100 parts to form 100 squares, the average number of the convex portions per square containing the convex portions is less than 2.5 from the viewpoint of improving the effect of preventing Newton ring formation and glare.

In the optical film of the present invention, it is preferable that the optical film has a transmission image clarity defined in JIS K7105 (2006) of 180 to 310 from the viewpoint of improving visibility of transmitted light of the optical film.

In the optical film of the present invention, it is preferable that the hard coat layer (A) is a cured product of a curable resin composition for a hard coat layer, the composition comprising 0.05 to 1.5 parts by weight of particles with respect to 100 parts by weight of a binder component; the particles has an average particle diameter of 1.5 to 8 μm; and a refractive index difference between the particles and the binder component after curing is 0.07 or less.

In the optical film of the present invention, it is preferable that a transparent electroconductive film is provided on or above the surface of the hard coat layer (A), which is opposite to the surface where the optically-transparent substrate is present, since the optical film is suitably used for touch panel applications.

In the touch panel of the present invention, a second transparent electroconductive film is further provided on the transparent electroconductive film side of the optical film in which the transparent electroconductive film is provided on or above the surface of the hard coat layer (A), which is opposite to the surface where the optically transparent substrate is present.

The transparent electroconductive film is provided on the surface of the hard coat layer (A) having the specific arithmetic mean roughness and convex portions, thus, even if the transparent electroconductive film is brought into contact with the second transparent electroconductive film, the touch panel which prevents Newton ring formation and glare, and has high visibility can be obtained.

In a preferred embodiment of the touch panel of the present invention, the touch panel of the present invention can be a touch panel comprising said touch panel and a liquid crystal cell, wherein said touch panel is provided so that the second transparent electroconductive film side of said touch panel is located on the liquid crystal cell side, and comprising a polarizing plate on or above a surface of the optically-transparent substrate, which is opposite to the surface where the hard coat layer (A) is present.

Advantageous Effects of Invention

In the touch panel of the present invention, the surface of the hard coat layer (A), which is opposite to the surface where the optically-transparent substrate is present, has the above-specified arithmetic mean roughness (Ra) and convex portions, thus, even if the transparent electroconductive film provided on the surface of the hard coat layer (A) having the above-specified arithmetic mean roughness and convex portions is brought into contact with the second transparent electroconductive film provided so as to face the transparent electroconductive film, the touch panel of the present invention can be a touch panel which prevents Newton ring formation and glare, shows high transmission image clarity, prevents haze and has high visibility. Also, the optical film of the present invention is easily applicable to such a touch panel.

DESCRIPTION OF EMBODIMENTS

Hereinafter, an optical film and a touch panel of the present invention will be described in order.

In the definition of a film and sheet in JIS-K6900, a sheet means a thin and flat product in which the thickness of the sheet is generally thin considering the length and width thereof, and a film means a thin and flat product in which the thickness of the film is significantly thin compared with the length and width thereof and the maximum thickness is arbitrarily limited, generally provided in a form of a roll. Therefore, it can be said that a sheet having a particularly thin thickness among sheets is a film. However, the boundary between sheets and films is unclear and it is difficult to precisely distinguish the difference between sheets and films. Accordingly, in the present invention, the definition of "film" includes both one having a thick thickness and one having a thin thickness.

In the present invention, "hard coat layer" refers to one having a hardness of "H" or more in Pencil hardness test (4.9N load) defined in JIS K5600-5-4 (1999).

(Optical film)

The optical film of the present invention is an optical film comprising an optically-transparent substrate and at least one hard coat layer (A) disposed on a surface of the optically-transparent substrate, wherein a surface of the hard coat layer (A), which is opposite to a surface where the optically-transparent substrate is present, has an arithmetic mean roughness (Ra) defined in JIS B0601 (1994) of 0.025 to 0.05 µm, and has 10 to 250 convex portions each having a height of 0.3 to 3 µm in a 1.08 mm square area.

Figure 2:
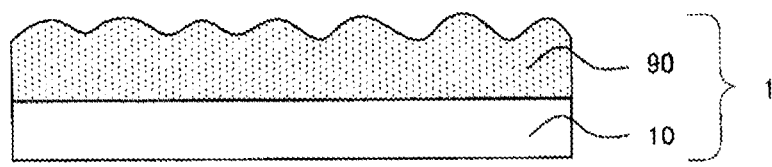
FIG. 2 is a sectional view schematically showing an example of a constitution of an optical film of the present invention.

FIG. 2 is a sectional view schematically showing an example of a constitution of layers of the optical film of the present invention.

Hard coat layer (A) 90 is disposed on a surface of optically-transparent substrate 10. The surface of hard coat layer (A) 90, which is opposite to the surface where the optically-transparent substrate is present, has an arithmetic mean roughness (Ra) of 0.025 to 0.05 µm, and has 10 to 250 convex portions each having a height of 0.3 to 3 µm in the 1.08 mm square area.

Figure 3:
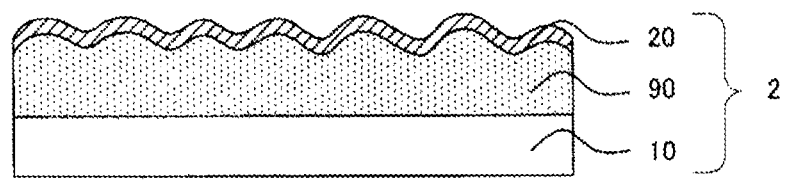
FIG. 3 is a sectional view schematically showing one of other examples of the constitution of the optical film of the present invention.

FIG. 3 is a sectional view schematically showing one of other examples of the constitution of layers of the optical film of the present invention.

Transparent electroconductive film 20 is further provided on hard coat layer (A) 90 of optical film 2 in FIG. 2.

Figure 4:
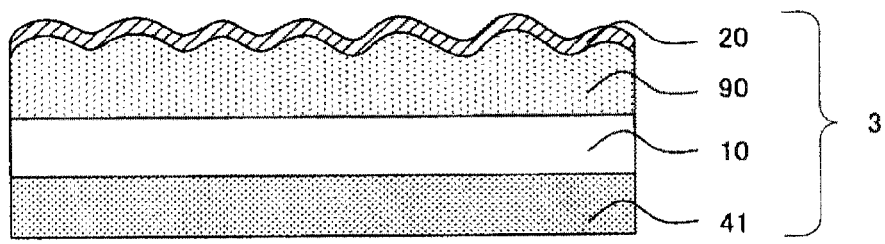
FIG. 4 is a sectional view schematically showing one of other examples of the constitution of the optical film of the present invention.

FIG. 4 is a sectional view schematically showing one of other examples of the constitution of layers of the optical film of the present invention.

On a surface of optically-transparent substrate 10, hard coat layer (A) 90 having a specific arithmetic mean roughness and convex portions and transparent electroconductive film

20 are provided similarly as in FIG. 3. On the other surface of optically-transparent substrate 10, second hard coat layer 41 is provided.

The transmission image clarity of the optical film of the present invention may be appropriately adjusted in accordance with required performances such as hardness, etc., and is preferably from 180 to 310, from the viewpoint of improving visibility of transmitted light of the optical film. If the transmission image clarity is less than 180, visibility may decrease and glare may occur. If the transmission image clarity is more than 310, the effect of preventing Newton ring formation may decrease. That is, if the transmission image clarity is from 180 to 310, visibility is high, glare is prevented, and the effect of preventing Newton ring formation is high.

In the present invention, transmission image clarity means a sum of numerical values measured with four types of optical comb (0.125 mm, 0.5 mm, 1 mm and 2 mm) by means of an image clarity meter (product name: ICM-1PD; manufactured by: Suga Test Instruments Co., Ltd.) according to the measurement of image clarity defined in JIS K7105 (2006). The transmission image clarity is higher as the numerical value is higher. The maximum value of the transmission image clarity is 400. While the reasons are unknown, the sum of numerical values measured with four types of optical comb is correlated with visibility as described above.

The optical film of the present invention preferably has a haze of 3% or less. If the haze is 3% or less, visibility of the image display surface is excellent when used for the touch panel. The haze of the optical film is more preferably 0.1 to 1.0%.

In the present invention, the haze is a value measured by means of a haze meter (product name: HM-150; manufactured by: Murakami color research laboratory) according to JIS K-7136 (2000).

Hereinafter, the optically-transparent substrate and the hard coat layer (A), which are essential components of the optical film of the present invention, will be firstly described. Next, other components such as a transparent electroconductive film and a second hard coat layer, which can be optionally provided, will be described.

(Optically-transparent Substrate)

The optically-transparent substrate of the present invention is not particularly limited as long as it has physical properties that are required for the optically-transparent substrate of the optical film. The optically-transparent substrate which is used in conventionally-known optical films or touch panels, including resins such as triacetylcellulose (TAC), polyethylene terephthalate (PET), polycarbonate (PC) and cyclo-olefin polymer (COP), may be appropriately selected for use. In addition, the optically-transparent substrate may be made of glass.

The average light transmittance of the optically-transparent substrate in the visible light range of 380 to 780 nm is preferably 50% or more, more preferably 70% or more, still more preferably 85% or more. Light transmittance is measured by means of an ultraviolet-visible spectrophotometer (product name: UV-3100PC; manufactured by: Shimadzu Corporation) and values measured at room temperature in the air are used.

The optically-transparent substrate may be subjected to the surface treatment such as saponification treatment or providing a primer layer. In addition, an additive such as an antistatic agent may be added to the optically-transparent substrate.

The thickness of the optically-transparent substrate is not particularly limited, and is generally from 30 to 250 μm, preferably from 40 to 200 μm.

The optical film of the present invention is suitably used for the touch panel applications. Depending on the touch panel embodiment, the touch panel of the present invention can be an inner touch panel comprising a liquid crystal cell and a polarizing plate as described hereinafter.

In this case, as the optically-transparent substrate which is in contact with the polarizing plate located on the input operation side, COP having a function as a retardation film is preferably used from the viewpoint of simplifying the layer constitution and reducing the production cost.

As the COP, ZEONOR series (product names: ZF16 and ZF14 (isotropic film), and ZM16 (λ/4 film); manufactured by: ZEON CORPORATION) are preferably used.

(Hard Coat Layer (A))

In the hard coat layer (A) which is essential for the optical film of the present invention, the surface of the hard coat layer (A), which is opposite to the surface where the optically-transparent substrate is present, has an arithmetic mean roughness (Ra) defined in JIS B0601 (1994) of 0.025 to 0.05 μm, and has 10 to 250 convex portions each having a height of 0.3 to 3 μm in a 1.08 mm square area.

The hard coat layer (A) has the above-specified arithmetic mean roughness and convex portions. Thus, as shown in FIGS. 3 and 4, the same shape is imparted to the transparent electroconductive film provided on the hard coat layer (A). Therefore, even if the transparent electroconductive film is brought into contact with the second transparent electroconductive film when the optical film is used for the touch panel that will be described hereinafter, Newton ring formation and glare are prevented, transmission image clarity increases, haze is prevented and high visibility is obtained.

If the arithmetic mean roughness (Ra) is less than 0.025 μm, Newton ring formation cannot be sufficiently prevented when used for the touch panel. If the Ra is more than 0.05 μm, glare can be high when used for the touch panel, thus, visibility decreases.

The Ra is preferably from 0.030 to 0.045 μm from the viewpoint of further preventing Newton ring formation and glare, increasing transmission image clarity, and preventing haze in an optimum range.

The arithmetic mean roughness (Ra) can be obtained by means of SE-3400 (product name; manufactured by: Kosaka Laboratory Ltd.).

Figure 10:
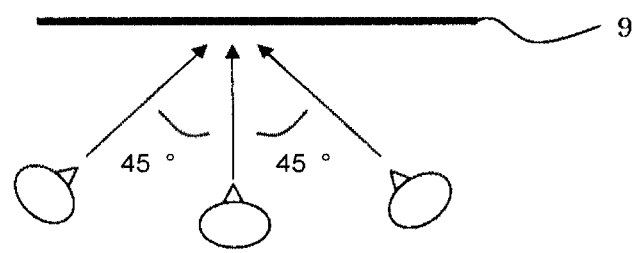
FIG. 10 is a view schematically showing an example of the eye movement when visually observing glare.

The glare caused when the optical film is used for the touch panel will be described below. The touch panel display which emits white light is observed at a point 30 cm away from the panel, firstly from the front side, in a bright room. As shown in FIG. 10, the panel 9 is observed with the body continuously moving in various directions at 45 degrees, including right, left, upper light, left below, etc., to the front side, and also with the direction of eyes changing without shifting the observing point. When continuously observed the panel with the direction of eyes changing, specifically-glittered and strongly-bright parts are found in some parts of the surface of the panel. In the visual observation as described above, the phenomenon in which brightness is increased at a certain point is called as glare. It is presumed that glare is caused by something in the concavo-convex shape of the optical film.

The surface of the hard coat layer (A), which is opposite to the surface where the optically-transparent substrate is present, has 10 to 250 convex portions each having a height of 0.3 to 3 μm in a 1.08 mm square area. The number of the convex portions and the height of the convex portions in the 1.08 mm square area can be obtained by means of a non-contact optical surface profiler (product name: New View 6000 (interferometer series); manufactured by: Zygo Corporation).

The number of the convex portions can be obtained by counting the number of peaks of the convex portions in the 1.08 mm square area.

Figure 11:
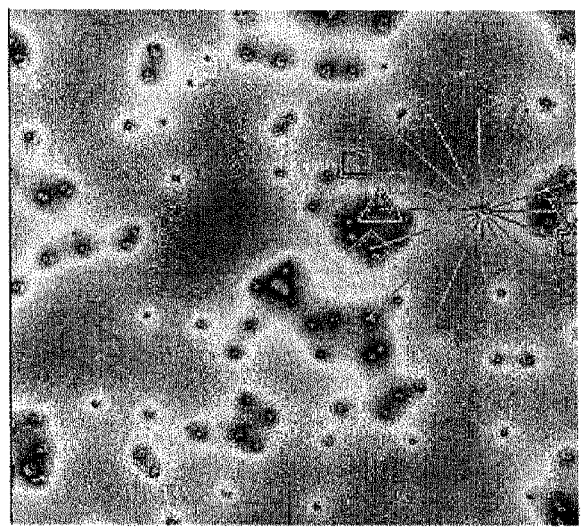
FIG. 11 is a view schematically showing an example of the case where eight cross-sectional surfaces of a convex portion are created by cutting the convex portion at every 22.5°, centering around the peak of the same.
Figure 12:
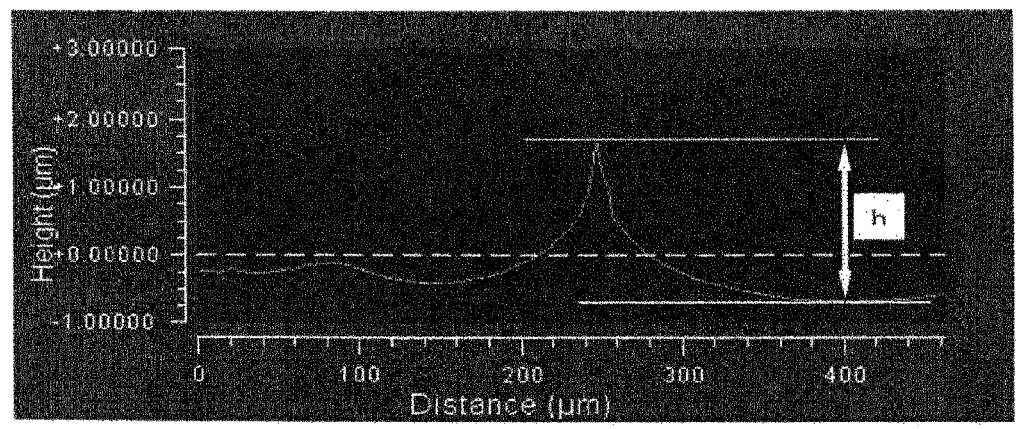
FIG. 12 is a view schematically showing an example of the case where the height h in the cross-sectional surface of the convex portion is calculated.

The height of the convex portions can be obtained from the following steps: creating eight cross-sectional surfaces of a convex portion by cutting the convex portion, at every 22.5°, centering around the peak of the same, as shown in FIG. 11; obtaining height h of each cross-sectional surface by the formula: h="the height of the peak"−"the height of the deepest valley", as shown in FIG. 12; and the average value of the height h is calculated.

It is preferable that the surface has 35 to 210 convex portions each having a height of 0.3 to 3 μm in the 1.08 mm square area from the viewpoint of preventing Newton ring formation and glare. In this case, the transmission image clarity and haze can be in a preferred state.

It is preferable that when the area is uniformly divided into 100 parts to form 100 squares, the average number of the convex portions per square containing the convex portions is less than 2.5, from the viewpoint of improving the effect of preventing Newton ring formation and glare when used for the touch panel. In addition, it is preferable that no parts (squares) where the convex portions are extremely aggregated are present in the area, from the viewpoint of preventing glare and maintaining excellent appearance. That is, the presence of a certain amount of convex portions is preferable in order to prevent Newton ring formation, and it is preferable that the convex portions are not concentrated in a specific part in the area and are sparsely and randomly present in the whole surface of the area in order to prevent glare.

In the average number of the convex portions, "average number" means an arithmetic average.

The average number of the convex portions per square is calculated from dividing the number of the convex portions each having a height of 0.3 to 3 μm in the 1.08 mm square area by the number of squares having the convex portions each having a height of 0.3 to 3 μm. For example, in the case that, the number of the squares having the convex portions each having a height of 0.3 to 3 μm is 90 in 100 squares and the number of the above-mentioned convex portions is 190, the average number of the convex portions is 2, which is calculated from the formula "180/90=2".

Figure 1:
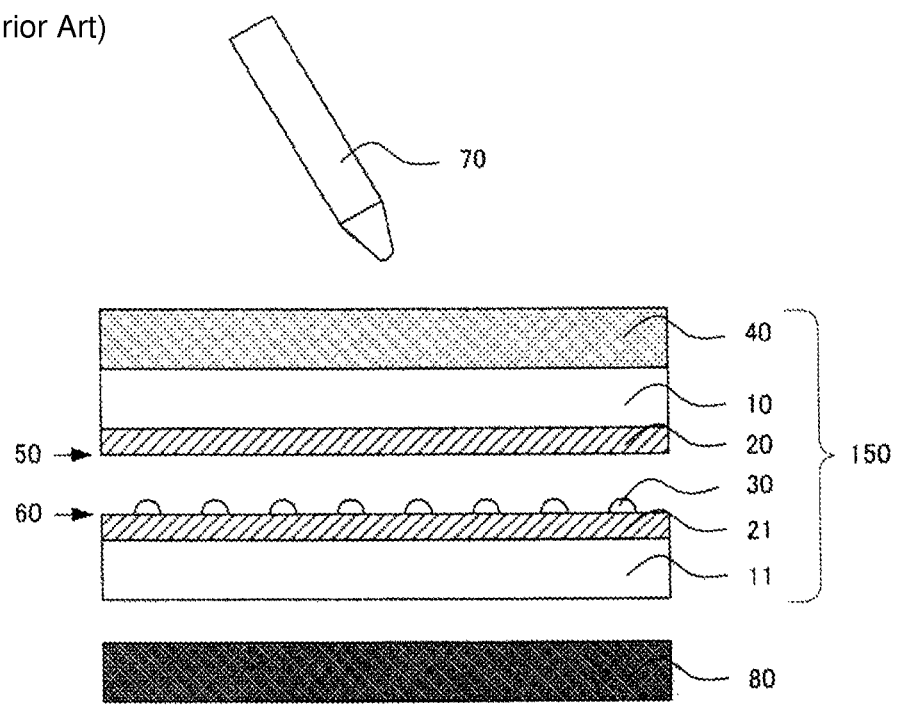
FIG. 1 is a sectional view schematically showing an example of a constitution of a conventional touch panel.

The hard coat layer (A) has more excellent hardness and abrasion resistance than those of the optically-transparent substrate. Thus, compared with the case where the hard coat layer (A) is not provided on a display side of the optically-transparent substrate as shown in FIG. 1, there can be prevented from decreasing visibility of transmitted light of the optical film due to damage.

The laminated thickness of the hard coat layer (A) is not particularly limited, and may be appropriately adjusted so that it achieves the hardness of the hard coat layer, and the surface of the hard coat layer (A), which is opposite to the surface where the optically-transparent substrate is present, has the specific arithmetic mean roughness and convex portions. Generally, the laminated thickness of the hard coat layer (A) is preferably from 2 to 13 μm, more preferably from 2.5 to 8.5 μm. The laminated thickness can be measured by the nondestructive measurement by means of a laser microscope (product number: TCS SP; manufactured by: Leica; confocal laser microscope). The laminated thickness can be obtained from measuring the distance from the surface of an ultraviolet curable resin in the part having no convex portions to the substrate surface. Any three points in the screen of a microscope observation are measured, and this measurement is performed in three screens. Then, an average value of the measurement values of 9 points obtained from the three screens is defined as the laminated thickness.

Hereinafter, there will be described a curable resin composition for a hard coat layer (hereinafter, it may be simply referred to as "a composition for a HC layer") which forms a hard coat layer (A) by curing.

(Curable Resin Composition for Hard Coat Layer)

The composition for the HC layer comprises at least particles for forming the above described arithmetic mean roughness and convex portions on the surface of the HC layer, and a binder component having photocurability.

Hereinafter, the particles and binder component, which are essential components, and a solvent, a polymerization initiator, an antistatic agent, a leveling agent and fine particles for imparting hardness, which are optional components, will be described.

(Particles)

As the particles, particles with anti-glare properties used for conventionally-known anti-glare film, etc. can be used.

The particles include organic particles and inorganic particles, and either one may be used.

Examples of the inorganic particles include oxides containing at least one kind of metal element selected from silicon, aluminum, zinc, titanium, zirconium, yttrium, indium, antimony, tin and tungsten. Preferred inorganic particles are silicon oxide (silica) particles, and they can be used regardless of those shapes and crystal state. The shape is preferably amorphous rather than spherical. This is because preferable concavo-convex shape can be obtained even if the added amount of the amorphous particles is small. In addition, inorganic fine particles (C) disclosed in Patent Literature 1, wherein at least part of the surface of the particles is covered with an organic component, and each particle has reactive functional groups introduced onto the surface covered by the organic component, can be preferably used as the particles since the inorganic particles (C) can cross-link with the binder component that will be described hereinafter to increase adhesion.

Examples of the organic particles include organic particles such as melamine beads, polystyrene beads and acrylic beads disclosed in JP-A No. 2009-116336.

The shape of the particles is not particularly limited as long as the above-mentioned surface shape can be imparted to the surface of the HC layer (A). Any of shapes such as perfect spherical shape, nearly spherical shape, acicular shape and spheroidal shape may be used. Preferred shape is perfect spherical shape or nearly spherical shape.

In the resin composition, the particle diameter of the particles may be appropriately adjusted depending on the thickness of the HC layer (A) and the shape of the particles. The average particle diameter is preferably from 0.5 to 8.0 μm, more preferably from 1.5 to 8.0 μm. Also, the average particle diameter of the particles in the HC layer (A) after curing is preferably from 1.5 to 8.0 μm. If the average particle diameter is less than 1.5 μm, the effect of preventing Newton ring formation may decrease. If the average particle diameter is more than 8.0 μm, transmission image clarity decreases and haze increases, thus, visibility may decrease.

The average particle diameter is preferably from 90 to 120% with respect to the laminated thickness of the HC layer intended to be formed. If the average particle diameter is within the above range, the above-specified arithmetic mean roughness and convex portions are easily formed on the surface of the HC layer (A). If the average particle diameter is less than 90% with respect to the thickness of the HC layer intended to be formed, particles are buried in the HC layer, thus, the effect of preventing Newton ring formation may decrease. If the average particle diameter is more than 120% with respect to the thickness of the HC layer intended to be formed, transmission image clarity decreases and haze increases, thus, visibility may decrease.

The average particle diameter refers to the average of particle diameters which is measured by the Coulter counter method, and is the volume particle size distribution expressed by a comulative distribution. The average particle diameter can be measured by means of an accurate particle sizing and counting analyzer (for example, product name: Coulter Multisizer 3; manufactured by: Beckman Coulter, Inc.).

On the other hand, the average particle diameter of the particles in the cured layer (HC layer (A)) can be measured by the following processes: the concavo-convex surface is subjected to transmission observation by means of an optical microscope (for example, product name: VHX200 digital microscope; manufactured by: Keyence corporation); any 10 particles are selected from the observed particles to measure those particle diameters; and thus the average particle diameter (μm) thereof is calculated. In particular, the short axis diameter and long axis diameter of each of the particles are measured, and thus obtained average is defined as the particle diameter of the particle. The particle diameters of 10 particles are measured to calculate the overall average value.

If the particles are organic particles, the particles may be swelled or contracted due to the effect of the solvent or monomer. To the contrary, if the particles are inorganic particles, physical properties of the particles are nearly-unchanged due to the effect of the solvent or monomer. However, the particles may be aggregated in the cured layer. Thus, the average particle diameter of the particles in the cured layer may be changed from that of material particles. However, the average particle diameter of the particles is preferably from 1.5 to 8 μm in the cure layer (HC layer (A)). In the cured layer, each of the particles which form a convex shape is regarded as one particle even if each of the particles is a primary particle or secondary particle. The short axis diameter and long axis diameter of each of 10 particles are measured to calculate the overall average value, and then, this value is defined as the average particle diameter in the cured film.

If the average particle diameter of the material particle measured by the Coulter counter method is within the preferable range, preferable convex portions can be formed in the cured layer, and the average particle diameter in the cured layer can be set in the range from 1.5 to 8 μm.

The particles may be used alone or in combination of two or more kinds particles made of different materials and having different shapes or different particle diameters.

The hard coat layer (A) is a cured product of the curable resin composition for the hard coat layer comprising the particles and the binder component, and the content of the particles is preferably from 0.05 to 1.5 parts by weight, more preferably from 0.1 to 1 parts by weight with respect to 100 parts by weight of the binder component. It is preferable that the particles are contained in the above ratio with respect to the binder component since Newton ring formation and glare can be prevented.

Furthermore, in the hard coat layer (A), the refractive index difference between the particles and the binder component after curing is preferably 0.07 or less. This is because haze decreases, and excellent visibility having higher transmission image clarity and contrast can be obtained. To improve the contrast, transmittance and transmission image clarity, smaller refractive index difference is more preferable, for example, the difference is more preferably 0.03 or less. On the other hand, to prevent glare, a certain level of the refractive index difference is imparted to the HC layer, and internal diffusibility may be imparted to the HC layer. The refractive index difference is still more preferably 0.05 or less because contrast, transmittance and transmission image clarity can be improved and the property for preventing glare can be also improved in a balanced manner.

The refractive index difference can be measured by means of a transmission laser microscope using a phase-shifting technique (product name: PLM-OPT; manufactured by NTT Advanced Technology Corporation) using the HC layer (A) after forming the optical film. As the measurement step, the method described in Examples that will be described hereinafter can be used. In this method, it is necessary to peel the HC layer from the substrate. However, if the HC layer cannot be peeled from the substrate, the HC layer after curing (part where particles are not present) is scraped off, and the refractive index of the cured HC is measured by B method in the method for measuring the refractive index of plastic defined in JIS K7142 (1996), and then the difference between the refractive index of the cured HC and the refractive index of the particles used for the composition is calculated. In the case where the particles are inorganic particles, amorphous particles and particles having a refractive index which is quite closer to that of the HC layer, that is, in the case where the shape of the particles is not clearly observed by the optical microscope, the refractive index of the cured HC is measured to calculate the difference between the refractive index of the cured HC and the refractive index of the particles used for the composition by the same method as that in the case where the HC layer cannot be peeled from the substrate. Especially in the case of the inorganic particles, unlike the organic particles, swelling, etc. is hardly caused by the monomer or solvent even in the composition, so that the above calculating method can be used. In the case of the organic particles, refractive index may be varied due to several reasons in the case of using a single material and after curing the composition. Therefore, the method using the transmission laser microscope using a phase-shifting technique is preferable.

(Binder Component)

The binder component contained in the composition for the HC layer is not particularly limited as long as it is a binder component having photocurability and can impart sufficient strength as a HC layer after being cured. It is preferable to use a photocurable resin since production cost can be reduced, high transmission image clarity can be obtained, haze can be decreased, and the effect of preventing stable Newton ring formation is high due to easily obtaining the hardness of the HC layer. The photocurable resin has a photo-curable group, more preferably has an ionizing radiation-curable unsaturated group. The specific examples include ethylenically unsaturated bonds such as a (meth)acryloyl group, a vinyl group and an allyl group, and epoxy groups. In the present invention, (meth)acryloyl refers to acryloyl and/or methacryloyl, and (meth)acrylate refers to acrylate and/or methacrylate.

As the photocurable resin, generally, an ultraviolet curable resin and an electron beam curable resin can be used. As the photocurable resin, a photocurable component having at least one functional group which causes polymerization (hereinafter, referred to as curing) reaction by light may be contained. As the photocurable component, a compound having a radically polymerizable unsaturated double bond is applicable, and the examples include monofunctional monomer, di- or more polyfunctional monomer, functional oligomer and functional polymer.

As the monofunctional monomer, for example, (meth)acrylate such as acrylic acid, methyl acrylate, ethyl acrylate, butyl acrylate, 2-ethylhexyl acrylate, isobutyl acrylate, methyl methacrylate, 2-hexylacrylate, 2-ethylhexylacrylate, 2-hydroxyacrylate, 2-hydroxyethylacrylate, 2-hydroxypropylacrylate, nonylphenol EO adduct acrylate (DNPA), phenoxyethylacrylate, 2-hydroxy-3-phenoxypropylacrylate (HPPA) and 3-ethyl-3-hydroxymethyloxetane, or alkyl or aryl ester thereof, styrene, methylstyrene and styrene-acrylonitrile are applicable.

As the difunctional monomer, for example, 1,6-hexanediol acrylate (HDDA), ethylene glycol diacrylate, neopentyl glycol diacrylate (NPGDA), diethylene glycol diacrylate (DEGDA), tripropylene glycol diacrylate (TPGDA), polyethylene glycol 400 diacrylate (PEG 400DA), hydroxyl pivalic acid neopentyl glycol diacrylate (HPNDA), EO-modified bisphenol A diacrylate, and 1,4-bis[(3-ethyl-3-oxethanylmethoxy)methyl]benzene are applicable.

As the polyfunctional monomer, di- or more functional (meth)acryloyl monomers obtained by reacting a di- or more functional compound such as ethylene glycol, glycerin, pentaerythritol or an epoxy resin with (meth)acrylic acid or a derivative thereof are applicable. The examples include trimethylolpropane triacrylate (TMPTA), pentaerythritol triacrylate (PETA), pentaerythritol tetraacrylate, dipentaerythritol pentaacrylate, dipentaerythritol hexaacrylate (DPHA), EO-modified trimethylol propane triacrylate and dimethylolpropane tetraacrylate.

As the polyfunctional oligomer (referred to as a prepolymer), polyurethanes, polyesters, polyethers, polycarbonates and poly(meth)acrylic esters, each having a molecular weight (weight average) of about 300 to 5,000 and a radically polymerizable double bond such as a (meth)acryloyl group, a methacryloyl group, an allyl group or an epoxy group in a molecule, are applicable. The examples include: unsaturated polyesters such as a condensation product of unsaturated dicarboxylic acid with polyalcohol; (meth)crylates such as polyester(meth)acrylate, urethane(meth)acrylate, polyester urethane(meth)acrylate, polyether(meth)acrylate, polyol (meth)acrylate, melamine(meth)acrylate, isocyanurate (meth)acrylate and epoxy(meth)acrylate; cationically polymerizable epoxy compounds; and silicon resins such as siloxane.

As the polyfunctional polymer, urethane(meth)acrylate, isocyanurate(meth)acrylate, polyester urethane(meth)acrylate, epoxy(meth)acrylate and silicon resins such as siloxane, each having a molecular weight (weight average) of about 5000 to 300,000 and a radically polymerizable double bond such as an acryloyl group, a methacryloyl group, an allyl group or an epoxy group, are applicable.

The monomer, oligomer and polymer of the photocurable resin may be used alone or in combination of two or more kinds.

Since the production cost is reduced, and the effect of stably preventing Newton ring formation is high due to easily obtaining the hardness of the HC layer, it is particularly preferable that polyfunctional monomer, polyfunctional oligomer and polyfunctional polymer having two or more functional groups can be used alone or in combination of two or more kinds.

The binder component contained in the composition for the HC layer may further comprise thermoplastic resins, thermosetting resins and two-liquid mixing type resins. These may be used alone or in combination of two or more kinds.

Examples of the thermoplastic resins include: polyvinyl alcohol resins; olefin resins such as polyethylene and polypropylene; urethane resins; (meth)acrylic ester copolymers; styrene copolymers such as a styrene-butadiene-styrene block copolymer and a styrene-isoprene-styrene block copolymer; ethylene-vinyl acetate copolymers; butadiene resins; isobutylene resins; vinyl acetate resins; polystyrene resins; butyral resins; polyvinyl acetal resins; ABS resins; polyimide resins; polyamide resins; and silicon resins. The thermoplastic resin is used by dissolving in an appropriate solvent. Examples of the thermosetting resins include phenol resins, urea resins, melamine resins, epoxy resins, epoxy acrylate resins, polyurethane resins, polyurethane acrylate resins and unsaturated polyester resins. Examples of the two-liquid mixing type resins include two liquid urethane resins and two liquid epoxy resins.

(Solvent)

When relatively large amount of the binder component is used, the monomer and/or oligomer in the binder component can function as a fluid medium. Thus, the composition for the HC layer may be prepared without using the solvent. Therefore, the solvent is used for preparing the composition for the HC layer having excellent coatability by appropriately dissolving or dispersing a solid content to control the concentration thereof.

The solvent is not particularly limited as long as the binder component and the particles can be dissolved or dispersed therein. Several kinds of organic solvents including alcohols such as isopropyl alcohol, methanol and ethanol; ketones such as methyl ethyl ketone, methyl isobutyl ketone and cyclohexanone; esters such as ethyl acetate and butyl acetate; halogenated hydrocarbon; aromatic hydrocarbon such as toluene and xylene; and a mixed solvent thereof can be used.

These solvents may be used alone or in combination of two or more kinds.

(Polymerization Initiator)

Any of radical and cationic polymerization initiators may be appropriately selected for use, if necessary, for promoting a cross-linking reaction of a binder component and reactive silica fine particles having a surface-treated photo-curable group that will be described hereinafter. These polymerization initiators are decomposed by light irradiation and/or heating to generate radicals or cations, thereby, radical polymerization and/or cationic polymerization is promoted. Examples of the radical polymerization initiator by light include Irgacure 184 (1-hydroxy-cyclohexyl-phenyl-ketone), Irgacure 907 and Irgacure 369 (product names; manufactured by Ciba Japan K. K.).

In the case of using the polymerization initiator, the content thereof is preferably from 1 to 10% by weight with respect to the total solid content of the composition for the HC layer.

(Anti-static Agent)

As an anti-static agent, a conventionally-known anti-static agent can be used. For example, a cationic anti-static agent such as a quaternary ammonium salt, and fine particles such as indium tin oxide (ITO) can be used.

In the case of using the anti-static agent, the content thereof is preferably from 1 to 30% by weight with respect to the total solid content of the composition for the HC layer.

(Leveling Agent)

A conventionally-known leveling agent may be contained in the composition for the HC layer, for the purpose of imparting uniformity of layer thickness to the HC layer (A).

As the leveling agent, a leveling agent such as a fluorinated leveling agent or silicone leveling agent, which is used for the conventionally-known HC layer and anti-fouling layer, can be used. The leveling agent may be a copolymer containing both fluorine and silicone.

Examples of commercial products of the leveling agent include the leveling agent having no ionizing radiation-curable groups such as MEGAFACE series (product name: MCF350-5; manufactured by DIC Corporation) and the leveling agent having ionizing radiation-curable groups such as X22-163A and X22-164E (product name; manufactured by Shin-Etsu Chemical Co., Ltd.).

In the case of using the leveling agent, the content thereof is preferably from 0.02 to 2% by weight with respect to the total solid content of the composition for the HC layer.

(Particles for Imparting Hardness)

The composition for the HC layer of the present invention may contain particles having excellent hardness, such as inorganic fine particles, to improve hardness of the HC layer (A).

As the inorganic fine particles, ones used for a conventionally-known HC layer may be used. The examples include silica, aluminum oxide, zirconia and titania.

Also, inorganic fine particles having a reactive functional group (photo-curable group) on the surface thereof disclosed in Patent Literature 1 may be used. By using the above reactive inorganic fine particles, the photo-curable group of the reactive inorganic fine particles cross-links with the photo-curable group of the binder component, thus, the hardness of the HC layer can be further increased.

As the inorganic fine particles for imparting hardness, silica is preferable. Further, it is preferable that the particles are amorphous rather than spherical since excellent hardness can be obtained by adding a small amount of the particles.

The average primary particle diameter of the particles for imparting hardness is preferably from 1 to 100 nm from the viewpoint of the transparency of the HC layer (A).

(Transparent Electroconductive Film)

In the optical film of the present invention, as shown in FIG. 3, transparent electroconductive film 20 may be provided on or above a surface having a specific arithmetic mean roughness and convex portions of HC layer (A) 90 directly or via other layer such as a low refractive index layer that will be described later.

As the transparent electroconductive film, one which is used for a conventionally-known touch panel may be used. Examples of the transparent electroconductive film include: metal such as In and Sn; metal compounds such as indium oxide and tin oxide; metal oxides such as ITO; conductive polymers such as PEDOT-PSS (poly-3,4-ethylenedioxythiophene-polystyrene sulfonate), poly(p-phenylene), polyacetylene and carbon nanotube disclosed in Patent Literature 2. As the transparent electroconductive film, ITO is preferable.

The thickness of the transparent electroconductive film may be appropriately adjusted so as to uniform the surface resistance. For example, the thickness is appropriately adjusted so as to be 500Ω/□±3%.

(Second Hard Coat Layer)

In the optical film of the present invention, as shown in FIG. 4, second HC layer 41 may be provided on a surface of optically-transparent substrate 10, which is opposite to the surface where HC layer (A) 90 is present.

The second HC layer is not particularly limited, and may be the same as the HC layer (A), or function as a conventionally-known HC layer that is different from the HC layer (A).

An example of the conventionally-known HC layer includes a layer formed of a cured product of the composition containing the binder component and the reactive inorganic fine particles, such as the HC layer disclosed in Patent Literature 1. Also, the layer may be a layer mainly comprising the binder component without containing the reactive inorganic fine particles.

The thickness of the second hard coat layer may be appropriately adjusted in accordance with the required performances. For example, it can be set in the range from 1 to 20 μm.

(Low Refractive Index Layer)

Figure 5:
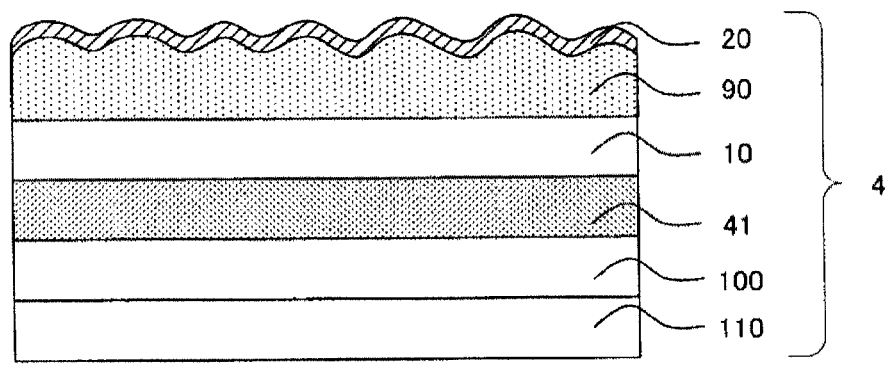
FIG. 5 is a sectional view schematically showing one of other examples of the constitution of the optical film of the present invention.

In the optical film of the present invention, as shown in FIG. 5, low refractive index layer 100 may be provided on a surface of second HC layer 41, which is opposite to the surface where optically-transparent substrate 10 is present.

The low refractive index layer may have a lower refractive index than that of a layer that is adjacent to the display side of the low refractive index layer when used for a touch panel, and the refractive index may be appropriately adjusted. The refractive index of the low refractive index layer is preferably 1.45 or less.

The low refractive index layer is a cured product of a composition containing a component having low refractive index, such as silica and magnesium fluoride, and a binder component, or a composition containing a fluorine-containing resin, such as a vinylidene fluoride copolymer, and it can function as a conventionally-known low refractive index layer.

The composition for forming the low refractive index layer may contain hollow particles for decreasing the refractive index of the low refractive index layer.

The hollow particles mean particles having a shell layer, wherein the inside of the shell layer is a porous structure or void. The porous structure or void contains air (refractive index: 1). By incorporating hollow particles having a refractive index of 1.20 to 1.45 in the low refractive index layer, the refractive index of the low refractive index layer can be decreased.

The average particle diameter of the hollow particles is preferably from 1 to 100 nm.

As the hollow particles, ones used for a conventionally-known low refractive index layer can be used. An example of the hollow particles includes fine particles having a void disclosed in JP-A No. 2008-165040.

The thickness of the low refractive index layer may be appropriately selected in accordance with required performances, and is from 80 to 120 nm. The thickness of the low refractive index layer is preferably adjusted mainly by its reflectance and color.

(Anti-fouling Layer)

In the optical film of the present invention, as shown in FIG. 5, anti-fouling layer 110 may be provided on the position which is the outermost surface on the part of input operation when the optical film is used for a touch panel, for the purpose of imparting anti-fouling property and abrasion resistance.

The anti-fouling layer is made of a composition containing a binder component and an anti-fouling agent such as a leveling agent, and it can function as a conventionally-known, anti-fouling layer.

Examples of the binder component and anti-fouling agent include ones described in the HC layer.

The content of the anti-fouling agent is preferably from 0.02 to 3% by weight with respect to the total solid content of the composition for the anti-fouling layer.

Besides the above, by adding the anti-fouling agent described in the HC layer (A) to the composition for forming the second HC layer, anti-fouling property may be imparted to the second HC layer.

In addition, by adding the anti-fouling agent described in the HC layer (A) to the composition for forming the low refractive index layer, anti-fouling property may be imparted to the low refractive index layer. Thereby, the structure such that low refractive index layer 100 and anti-fouling layer 110 in FIG. 5 are combined to make one layer is possible, for example (not shown in figure).

(Method for Producing Optical Film)

The method for producing the optical film of the present invention comprises the steps of:

preparing the curable resin composition for the hard coat layer;

performing application of the curable resin composition for the hard coat layer on one surface of the optically-transparent substrate so that a coating of the curable resin composition for the hard coat layer is formed on the surface of the optically-transparent substrate; and curing the coating of the curable resin composition for the hard coat layer with light irradiation to form the hard coat layer (A).

In the step of preparing the composition for the HC layer, the composition for the HC layer described in the HC layer (A) is prepared.

The composition for the HC layer is generally prepared by mixing and dispersing particles, a polymerization initiator, etc. besides the binder component in a solvent in accordance with a general preparing method. For mixing and dispersion, a paint shaker or a beads mill can be used. If the binder component has flowability, the composition for the HC layer can be applied on the optically-transparent substrate without using the solvent. Therefore, the solvent may be appropriately used, if necessary.

In the step of performing application of the composition for the HC layer so that the coating of the composition for the hard coat layer is formed, the application method is not particularly limited, and a conventionally-known method may be used. Examples of the application method include various kinds of methods such as a spin coat method, a dip method, a spray method, a slide coat method, a bar coat method, a roll coater method, a die coat method, a meniscus coater method, a flexo-printing method and a screen printing method.

In the step of forming the HC layer, for the light irradiation, in many cases, ultraviolet rays, visible light, electron beam, ionizing radiation or the like is used. In the case of ultraviolet curing, for example, ultraviolet rays emitted from a light source such as a LED, an ultra-high-pressure mercury lamp, a high-pressure mercury lamp, a low-pressure mercury lamp, a carbon arc lamp, a xenon arc lamp or a metal halide lamp can be used. The light irradiance level of the energy beam source is preferably from 50 to 500 mJ/cm$^2$ as the integral exposure amount of light at the ultraviolet wavelength of 365 nm.

In the case of heating in addition to the light irradiation, the heating is performed at generally from 40 to 120° C.

The drying may be performed after the application of the composition for the HO layer, before light irradiation. Examples of the drying method include a method of drying under reduced pressure, a heat-drying method and a method of combining the above methods.

For example, in the case of using methyl isobutyl ketone (MIBK) as the solvent of the composition for the HC layer, drying step can be performed at 30 to 150° C., preferably at 35° C. to 100° C., for 20 seconds to 3 minutes, preferably for 30 seconds to 1 minute.

(Formation of Other Layers)

In the case of forming one or more of other layers such as the above-described second HC layer, one or more of other layers may be formed by preparing the composition for one or more of other layers, applying the composition followed by curing the coating with light irradiation and/or heating similarly as in the HC layer (A) formation.

In the case of the transparent electroconductive film, especially in the case of the inorganic transparent electroconductive film such as ITO, a vacuum film forming method such as a vacuum vapor deposition method, a sputtering method or an ion plating method can be used. In the case of the organic transparent electroconductive film such as PEDOT-PSS, the same coating method as in the HC layer (A) can be used.

One or more of other layers such as the second hard coat layer other than the transparent electroconductive film may be formed before forming the HC layer (A) or after forming the HC layer (A).

(Touch Panel)

The touch panel of the present invention comprises the optical film wherein the transparent electroconductive film is provided on or above the surface of the hard coat layer (A), which is opposite to the surface where the optically-transparent substrate is present, and a second transparent electroconductive film is further provided on the transparent electroconductive film side of the optical film.

By using the optical film comprising the hard coat layer (A) having the specific arithmetic mean roughness and convex portions on the surface thereof and the transparent electroconductive film, wherein the transparent electroconductive film is provided on or above the hard coat layer (A), even if the transparent electroconductive film is brought into contact with the second transparent electroconductive film, the touch panel of the present invention can be a touch panel which prevents Newton ring formation and glare, shows high transmission image clarity, prevents haze and has high visibility.

Figure 6:
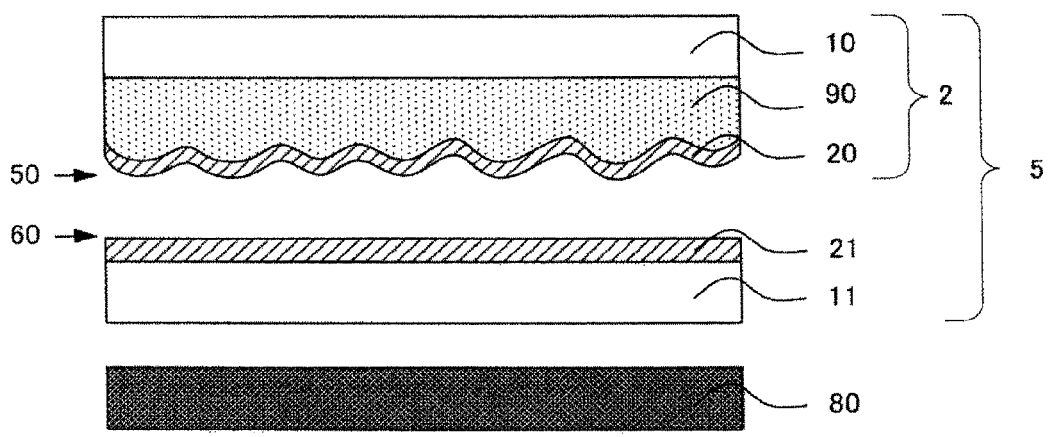
FIG. 6 is a sectional view schematically showing a positional relationship between an example of a constitution of layers of the touch panel of the present invention and a display.

FIG. 6 is a sectional view schematically showing a positional relationship between an example of a constitution of layers of the touch panel of the present invention and a display.

Optical film 2 and second optically-transparent substrate 11 having second transparent electroconductive film 21 on one surface thereof are disposed so that transparent electroconductive film 20 and second transparent electroconductive film 21 are faced each other. Touch panel 5 is located on the display surface side of display 80.

Display 80 can be any of a conventionally-known display such as LCD, CRT, organic EL, inorganic EL or plasma display.

Figure 7:
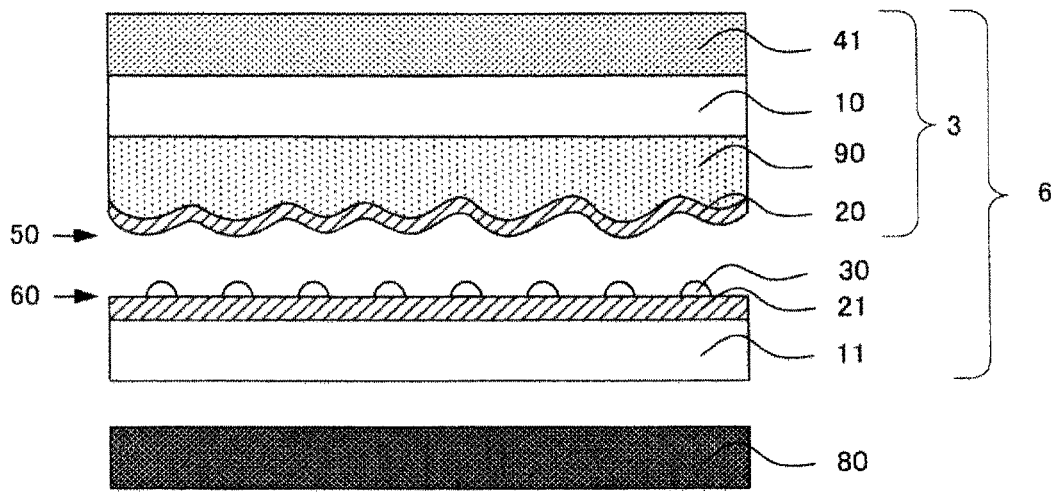
FIG. 7 is a sectional view schematically showing a positional relationship between one of other examples of a constitution of layers of the touch panel of the present invention and the display.

FIG. 7 is a sectional view schematically showing a positional relationship between one of other examples of a constitution of layers of the touch panel of the present invention and the display.

In touch panel 6 in FIG. 7, optical film 3 and second optically-transparent substrate 11 having second transparent electroconductive film 21 on one surface thereof are disposed so that transparent electroconductive film 20 and second transparent electroconductive film 21 are faced each other, and spacers 30 are provided between transparent electroconductive film 20 and second transparent electroconductive film 21. Touch panel 6 is located on the display surface side of display 80. Second hard coat layer 41 is provided on the input operation side-surface of optically-transparent substrate 10 of optical film 3.

Figure 8:
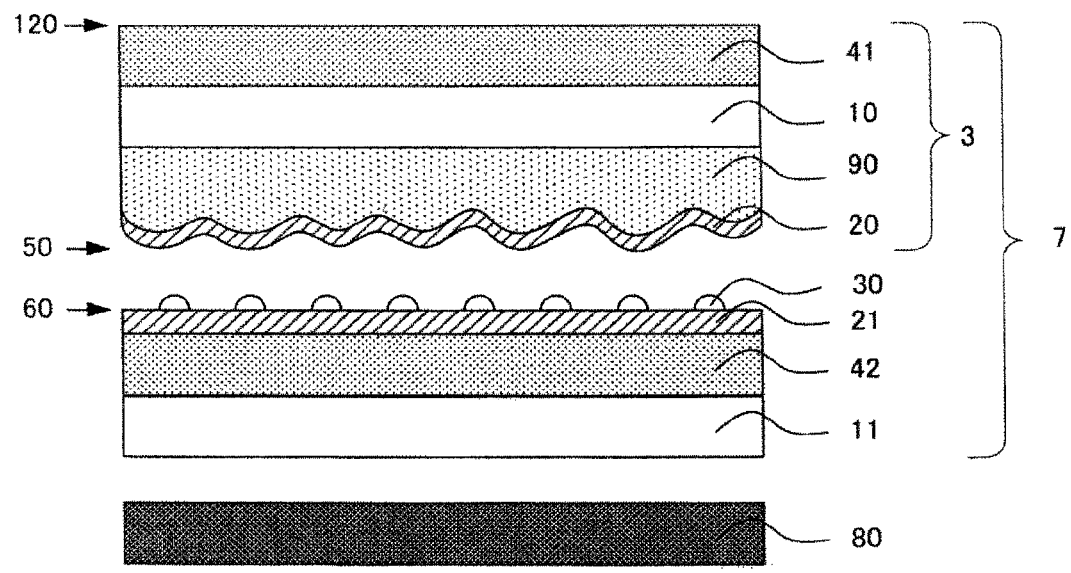
FIG. 8 is a sectional view schematically showing a positional relationship between one of other examples of a constitution of layers of the touch panel of the present invention and the display.

FIG. 8 is a sectional view schematically showing a positional relationship between one of other examples of a constitution of layers of the touch panel of the present invention and the display.

Touch panel 7 in FIG. 8 comprises touch panel 6 in FIG. 7, and further comprises third hard coat layer 42 between second transparent electroconductive film 21 and second optically-transparent substrate 11 both on the display side.

Figure 9:
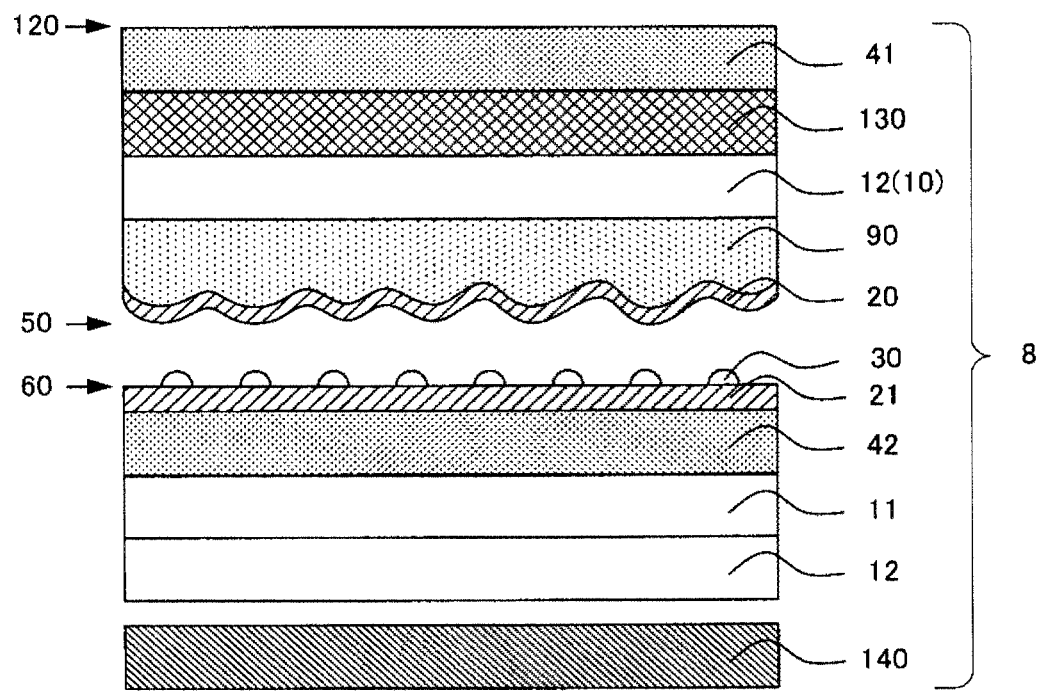
FIG. 9 is a sectional view schematically showing an example of a constitution of layers of an inner touch panel being one embodiment of the touch panel of the present invention.

FIG. 9 is a sectional view schematically showing a constitution of layers of an inner touch panel being one embodiment of the touch panel of the present invention.

Inner touch panel 8 in FIG. 9 comprises the touch panel in FIG. 8 and liquid crystal cell 140, wherein the touch panel is provided on one side of liquid crystal cell 140 so that the second transparent electroconductive film of the touch panel in FIG. 8 is located on the liquid crystal cell side, and retardation film (λ/4 plate) 12 is further provided on the liquid crystal cell side of the touch panel. In the inner touch panel in FIG. 9, the other retardation film 12 which doubles as the optically-transparent substrate is provided instead of optically-transparent substrate 10 of the touch panel in FIG. 8, and polarizing plate 130 is provided on or above the surface of retardation film 12, which is opposite to the surface where the hard coat layer is present, that is, between retardation film 12 and second hard coat layer 41.

In addition, a low refractive index layer may be provided between third hard coat layer 42 and second transparent electroconductive film 21 in FIG. 9 (not shown in figures).

Hereinafter, the optical film and second transparent electroconductive film, which are essential components of the touch panel of the present invention, and other components which can be appropriately provided as needed, will be described.

(Optical Film in Touch Panel)

The optical film in the touch panel of the present invention may comprise an optically-transparent substrate, a hard coat layer (A) and a transparent electroconductive film, wherein the hard coat layer (A) and the transparent electroconductive film are provided on at least one side of the optically-transparent substrate in this order from the optically-transparent substrate side, as shown in FIG. 3, among the above-described optical films. An explanation of such an embodiment that the hard coat layer (A) and the transparent electroconductive film are provided on at least one side of the optically-transparent substrate from the optically-transparent substrate side is omitted here since it is explained above.

In addition, as shown in FIGS. 4 and 5, when the optical film is used for the touch panel, a second hard coat layer and a low refractive index layer or an anti-fouling layer may be further provided on the position which is closer to the input operation side than the optically-transparent substrate.

As described hereinafter, the optical film may comprise a polarizing plate as shown in FIG. 9.

(Second Transparent Electroconductive Film)

As shown in FIGS. 6 and 8, the second transparent electroconductive film is provided on the second optically-transparent substrate that is different from the optically-transparent substrate of the optical film or the second hard coat layer, and is disposed on the position which faces the transparent electroconductive film of the optical film.

The transparent electroconductive film and the second transparent electroconductive film are faced each other, and those films can be contacted each other when pressing the transparent electroconductive films from the input operation side. Therefore, as shown in FIG. 7, spacers may be provided between the transparent electroconductive film and the second transparent electroconductive film, and an insulating film or the like other than spacers may be provided on the rim or the like of the transparent electroconductive film (not shown). Also, the transparent electroconductive film may face the second transparent electroconductive film only via a layer of gas such as air without providing the spacers and the insulating film.

As the second transparent electroconductive film, the transparent electroconductive film described in the optical film can be used.

The material and thickness of the second transparent electroconductive film may be the same as or different from those of the transparent electroconductive film.

The input operation side-surface 60 of the second transparent electroconductive film shown in FIGS. 7 to 9 may have a smooth surface or the concavo-convex shape as in the case of the transparent electroconductive film provided on the surface having the convex portions of the hard coat layer (A).

Surface 60 preferably has a smooth surface.

(Other Components of Touch Panel)

The touch panel of the present invention may appropriately comprise other components such as the second optically-transparent substrate, air space, spacers, second hard coat layer, polarizing plate, retardation film and liquid crystal cell, in accordance with require properties and embodiment, other than the above-described optical film and second transparent electroconductive film. These components will be described hereinafter.

(Second Optically-transparent Substrate)

As the substrate for the second transparent electroconductive film, as shown in FIG. 6, the second optically-transparent substrate may be used.

As the second optically-transparent substrate, the optically-transparent substrate described in the optical film can be used. The second optically-transparent substrate is preferably made of glass.

Also, a resin film is preferably used from the viewpoint of weight reduction.

In the case of using the glass, the thickness of the second optically-transparent substrate is from 0.2 to 2 mm. In the case of using the resin film, the thickness is preferably from 40 to 200 µm.

(Air Space)

As described above, the transparent electroconductive film and the second transparent electroconductive film may be faced each other in the touch panel. The space between the transparent electroconductive film and the second transparent electroconductive film may be an air space or void, and spacers may be provided therebetween as described hereinafter.

The height of the void (air space) is not particularly limited, and can be appropriately adjusted. For example, it can be set in the range from 75 to 200 µm.

(Spacers)

The spacers are provided for the purpose of ensuring the void between the transparent electroconductive film and the second transparent electroconductive film, controlling the load upon input operation, and improving the separation of the transparent electroconductive film and the second transparent electroconductive film after input operation.

As the spacers, the urethane resin and the particles disclosed in Patent Literature 2 can be used.

The dimension of each of the spacers may be appropriately adjusted, for example, the diameter may be from 30 to 50 µm and the height may be from 3 to 15 µm. The distance between spacers may be appropriately adjusted. For example, the spacers may be provided at a constant interval of 0.1 to 10 mm.

(Third Hard Coat Layer Provided on Display Side of Second Transparent Electroconductive Film)

As shown in FIGS. 8 and 9, the touch panel of the present invention may comprise third HC layer 42 for the purpose of imparting abrasion resistance, etc. between the second optically-transparent substrate and the second transparent electroconductive film.

The third HC layer 42 can be formed similarly as in the second HC layer described in the optical film. As with the second HC layer described in the optical film, the input operation side-surface of the third HC layer may have a smooth surface or the concavo-convex shape as in the case of the HC layer (A).

As shown in FIGS. 8 and 9, in the case where the second HC layer 41 is located on the outermost surface on the input operation side of the optical film, that is, on the surface side of the optically-transparent substrate 10, the input operation side-surface 120 of the second HC layer 41 may have a smooth surface or the concavo-convex shape as in the case of display side-surface 50 of the transparent electroconductive film.

In addition, not shown in figures, a refractive index layer or an anti-fouling layer can be provided on further input surface side of the second HC layer 41, which is located on the input surface side of optically-transparent substrate 10 described in the optical film. The low refractive index layer or anti-fouling layer may have the same smooth surface as that of the second HC layer 41, or the concavo-convex shape as in the case of the display side-surface 50 of the transparent electroconductive film.

(Polarizing Plate)

In a preferred embodiment of the touch panel of the present invention, as shown in FIG. 9, the touch panel of the present invention can be a touch panel (inner touch panel) comprising the above-described touch panel and the liquid crystal cell, wherein the touch panel is provided so that the second transparent electroconductive film side of the touch panel is located on the liquid crystal cell side, and a polarizing plate is provided on or above a surface of the optically-transparent substrate, which is opposite to the surface where the hard coat layer (A) is present, for the purpose of decreasing reflection.

As the polarizing plate, a conventionally-known polarizing plate used for the liquid crystal display can be used. For example, one comprising polarizer provided on a protective film can be used.

The polarizer is not particularly limited as long as it has the function as the polarizer, that is, the function to divide incident light into two polarization components that run at right angles to one another, and function to get through one of the polarization components and to absorb or disperse the other component. Examples of such a polarizer include polyvinyl alcohol (PVA)-iodine polarizer disclosed in JP-A No. 2009-226932.

As the protective film, TAC and PET of the optically-transparent substrate described in the optical film can be used.

In addition, in the touch panel other than the inner touch panel (for example, touch panel 5 in FIG. 6), in the case that the touch panel of the present invention is disposed on the image display surface side of the display such as LCD, CRT, organic EL, inorganic EL or plasma display, the polarizing plate may be disposed in the position around the input operation side-surface or the surface having the second hard coat layer of the optical film, for the purpose of decreasing reflection.

(Retardation Film)

The retardation film (retardation plate) is a film having a function to change a linearly polarized light to circularly polarized light or elliptically polarized light. In the inner touch panel, it is preferable to use a λ/4 plate (may be referred as to a quarter-λ plate or ¼λ plate) which causes a phase difference of ¼ wavelength (π/2) between polarization components that run at right angles.

As the λ/4 plate, a uniaxially oriented film made of various kinds of high-molecular materials, which is generally employed in the liquid crystal display field, can be used. Examples of the materials of the uniaxially oriented film include PVA, norbornene resins, COP, cellulose resins and polycarbonate resins.

An example of the commercial product of COP, which is a kind of the retardation film, includes ZEONOR series (product name: ZM16; manufactured by: Zeon Corporation). It is preferable that COP functions as the above-described optically-transparent substrate since the constitution of layers can be simplified and the production cost can be reduced.

(Liquid Crystal Cell)

In the liquid crystal display, the liquid crystal cell is a part which functions as a light shutter and is a unit comprising two glass substrates each having a transparent electroconductive film, etc., and having a liquid crystal material such as a liquid crystal molecule injected therebetween. As the liquid crystal cell, a conventionally-known liquid crystal cell can be used.

(Method for Producing Touch Panel)

The touch panel of the present invention can be produced by the conventionally-known method. For example, the above-mentioned optical film provided with the transparent electroconductive film and the optically-transparent substrate having the second transparent electroconductive film are disposed via the air space or the like so that the transparent electroconductive film and the second transparent electroconductive film are faced each other. Thus, the touch panel of the present invention can be produced.

EXAMPLES

Hereinafter, the present invention will be described further in detail with reference to Examples. The scope of the present invention may not be limited to the following examples, however.

As a particle (1), a cross-linked acrylic-styrene particle (product name: Techpolymer SMX series; manufactured by: Sekisui Plastics Co., Ltd.; average particle diameter: 7 μm; refractive index: 1.540) was used.

As a particle (2), a cross-linked acrylic-styrene particle (product name: Techpolymer SMX series; manufactured by: Sekisui Plastics Co., Ltd.; average particle diameter: 5.7 μm; refractive index 1.578) was used.

As a particle (3), an amorphous silica fine particle which is covered with an organic component and has a reactive functional group on the surface thereof (product name: NIPGEL AZ-360; manufactured by: Tosoh Corporation; average particle diameter: 3 μm; refractive index: 1.46 to 1.47) was used.

As a polyfunctional polyester acrylate, M9050 (product name; manufactured by: Toagosei Co., Ltd.) was used.

As a polyfunctional monomer, pentaerythritol triacrylate (product name: PET-30 (trifunctional); manufactured by: Nippon Kayaku Co., Ltd.) was used.

As a polymerization initiator (1), Irgacure (Irg) 184 (product name; manufactured by: Ciba Japan K. K.) was used.

As a polymerization initiator (2), Irgacure (Irg) 907 (product name; manufactured by: Ciba Japan K. K.) was used.

As a leveling agent, MCF 350SF (product name; manufactured by: DIC Corporation; oligomer containing a perfluoroalkyl group, a hydrophilic group and a lipophilic group) was used.

As an optically-transparent substrate (1), a COP film (product name: ZEONOR ZM16; manufactured by: ZEON corporation; thickness: 100 μm) was used.

As an optically-transparent substrate (2), a PET film (product name: A4300; manufactured by: Toyobo Co., Ltd.; thickness: 100 μm) was used.

(Preparation of Curable Resin Composition for HC Layer)

Curable resin composition 1 for a HC layer was prepared by compounding components of the following composition. The refractive index difference between the cross-linked acrylic-styrene particles and the mixture of polyfunctional polyesteracrylate and polyfunctional monomer being the binder components was 0.03.

(Curable Resin Composition 1 for HC Layer)

Cross-linked acrylic-styrene particle (particle (1); average particle diameter: 7 μm): 0.1 part by weight
Polyfunctional polyester acrylate (M9050): 80 parts by weight
Polyfunctional monomer (PET-30): 20 parts by weight
Polymerization initiator (1) (Irg-184): 4.5 parts by weight
Polymerization initiator (2) (Irg-907): 0.5 part by weight
Leveling agent (MCF-350SF): 0.1 part by weight
Methyl isobutyl ketone (MIBK): 129 parts by weight
(Production of Optical Film)

Example 1

The curable resin composition 1 for the HC layer was applied on one surface of the optically-transparent substrate (1), and the thus-obtained coating was dried in an oven at 70° C. for 60 seconds to evaporate the solvent in the coating. Then, the coating was cured with ultraviolet irradiation so that the integrated amount of light is 80 mJ/cm$^2$ to form a HC layer (A) having a thickness of 5.9 μm. Thus, an optical film was obtained.

Examples 2 to 7 and Comparative examples 1 to 5

Each of optical films in Examples 2 to 7 and Comparative examples 1 to 5 was obtained similarly as in Example 1 except that the optically-transparent substrate, a type and content of the particle, and the thickness of the HC layer (A) were change as shown in Table 1.

TABLE 1

| | Example 1 | Example 2 | Example 3 | Example 4 | Example 5 | Comparative example 1 | Comparative example 2 | Comparative example 3 |
|---|---|---|---|---|---|---|---|---|
| Type of particle | Cross-linked acrylic-styrene particle | | | Silica particle | | | | Cross-linked acrylic-styrene particle |
| Particle diameter (material) | 7 μm | 7 μm | 5.7 μm | 3.0 μm | | | | 5.7 μm |
| Particle diameter (after curing) | 7.2 μm | 7.1 μm | 5.9 μm | 3.2 μm | 3.3 μm | 3.2 μm | 3.2 μm | 5.9 μm |
| Refractive index difference | 0.03 | | 0.03 | 0.02 | | | | 0.03 |
| Content of particle | 0.1 part by weight | 1 part by weight | 0.1 part by weight | 0.3 part by weight | 0.1 part by weight | 1 part by weight | 1.5 parts by weight | 0.1 part by weight |
| Optically-transparent substrate | ZEONOR ZM16 | | PET (A4300) | | | ZEONOR ZM16 | | |
| Average laminated thickness | 5.9 μm | 6.5 μm | 5.0 μm | 3.2 μm | 2.9 μm | 3.1 μm | 2.9 μm | 6.0 μm |
| Ra | 0.039 μm | 0.045 μm | 0.032 μm | 0.031 μm | 0.033 μm | 0.076 μm | 0.107 μm | 0.019 μm |
| Height of convex portion | 2 to 2.5 μm | 0.5 to 1.0 μm | 0.7 to 1.5 μm | 0.4 to 1.6 μm | 0.6 to 1.7 μm | 0.56 to 2.0 μm | 0.63 to 2.2 μm | 0.06 to 0.28 μm |
| Number of convex portions | 38 | 206 | 53 | 102 | 47 | 193 | 289 | 0 |
| Average number of convex portions per square containing the convex portions | 1.1 | 2.4 | 1.2 | 1.5 | 1.3 | 2.2 | 3.1 | — |
| Transmission image clarity | 286 | 265 | 267 | 257 | 305 | 142 | 113 | 359 |
| Haze | 0.4% | 0.9% | 0.9% | 0.3% | 0.2% | 1.0% | 1.4% | 0.5% |
| Evaluation of glare | ○ | ○ | ◎ | ○ | ◎ | x | x | ◎ |
| Evaluation of Newton ring | 4 | 5 | 4 | 4 | 4 | 5 | 5 | 0 |

TABLE 2

| | Example 6 | Example 7 | Comparative example 4 | Comparative example 5 |
|---|---|---|---|---|
| Type of particle | Cross-linked acrylic-styrene particle | | Cross-linked acrylic-styrene particle | |
| Particle diameter (material) | 5.7 μm | 7 μm | 7 μm | 5.7 μm |
| Particle diameter (after curing) | 5.8 μm | 7.2 μm | 7.1 μm | 5.9 μm |

TABLE 2-continued

|  | Example 6 | Example 7 | Comparative example 4 | Comparative example 5 |
|---|---|---|---|---|
| Refractive index difference | 0.03 | 0.03 | 0.03 | 0.03 |
| Content of particle | 0.3 part by weight | 0.1 part by weight | 0.1 part by weight | 0.01 part by weight |
| Optically-transparent substrate | ZEONOR ZM16 | ZEONOR ZM16 | ZEONOR ZM16 | ZEONOR ZM16 |
| Average laminated thickness | 4.9 μm | 6.2 μm | 4.6 μm | 5.0 μm |
| Ra | 0.042 μm | 0.037 μm | 0.069 μm | 0.012 μm |
| Height of convex portion | 0.9 to 1.6 μm | 0.8 to 1.5 μm | 2.3 to 3.0 μm | 0.10 to 0.31 μm |
| Number of convex portions | 142 | 14 | 8 | 5 |
| Average number of convex portions per square containing the convex portions | 2.4 | 1.0 | 1.0 | 1.7 |
| Transmission image clarity | 241 | 280 | 295 | 367 |
| Haze | 0.6% | 0.50% | 0.3% | 0.2% |
| Evaluation of glare | ◉ | ◉ | x | ◉ |
| Evaluation of Newton ring | 5 | 4 | 1 | 0 |

(Evaluation)

The refractive index difference between the particles and the binder component after curing, arithmetic mean roughness (Ra), height of the convex portion, number of convex portions each having a height of 0.3 to 3 μm in the 1.08 mm square area, average number of convex portions per square containing the convex portions, transmission image clarity, haze and effect of preventing glare of the optical films prepared in Examples 1 to 7 and Comparative examples 1 to 5 were respectively measured, and thus, the effect of preventing Newton ring formation was evaluated. The results are shown in Tables 1 and 2. In Comparative example 3, the number of convex portions each having a height of 0.3 to 3 μm was 0 (zero), so that the result of the average number of the convex portions was shown as "–" (not evaluated).

(Measurement of Refractive Index Difference Between Particles and Binder Component)

The refractive index difference between the particles and the binder component after curing (part where particles of the HC layer were not present) was measured as described below by means of a transmission laser microscope using a phase-shifting technique (product name: PLM-OPT; manufactured by: NTT Advanced Technology Corporation).

Figure 13:
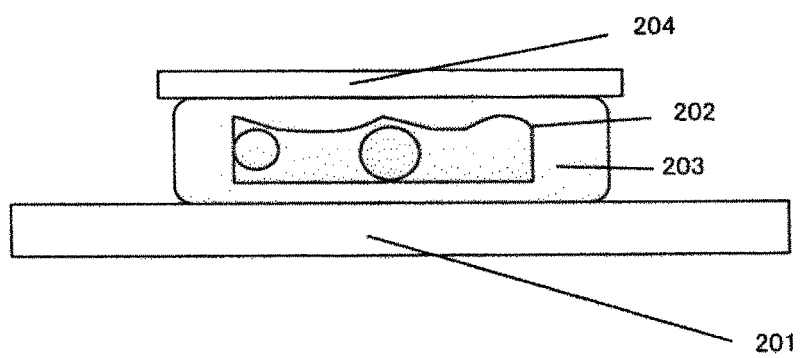
FIG. 13 is a sectional view schematically showing a sample preparation in the measurement of refractive index difference between particles and a binder component.

The prepared optical film was cut into a 3 cm square and placed in a flask to immerse in chloroform for 24 hours at room temperature. Then, only the HC layer was peeled from the substrate so that the size of the HC layer was about 5 mm square or more, and dried. As shown in FIG. 13, the peeled HC layer 202 was placed on glass slide 201 and immersed in oil 203 (manufactured by: Moritex corporation; CARGILLE standard refractive index liquid) having a refractive index equal to that of the binder component after curing. Then, cover glass 204 was placed thereon. Thereby, the surface roughness of the HC layer was optically planarized in the thickness direction of the HC layer, thus, the phase difference caused by the factor other than the particles can be eliminated. The oil having a refractive index equal to that of the binder component can be selected as described below. The hard coat part (part where the particles were not present) of the prepared optical film was scraped off with a cutter, and oil was dropped on the scraped HC in accordance with the B method of the method for measuring the refractive index of plastic defined in JIS K7142 (1996). This process was observed by means of an optical microscope, and the oil in which the scraped HC became invisible was selected.

The above-obtained sample was measured by means of the transmission laser microscope using a phase-shifting technique (measurement condition: He—Ne laser; measurement wavelength: 633 nm; measurement magnification: 200 times) by defining the incident direction of light as the thickness direction of the sample to calculate the phase difference between the binder component after curing and the particles. When the phase difference was measured, the measurement method includes a step of setting the position of the binder component after curing and the particle. In the case of the particle, the center part of the particle was selected as the position. In the case of the binder component, the part where no particle was present was selected as the position.

In addition, the transmission observation was performed by means of an optical microscope (product name: VHX200 Digital Microscope; manufactured by: Keyence corporation) to measure the particle diameter of ten particles, and then the average particle diameter (μm) was calculated. Furthermore, the refractive index difference between the binder component after curing and the particle was calculated from the following formula:

$$\Delta n = \Delta \phi \cdot \lambda / (2\pi \cdot d)$$

$\Delta n$: Refractive index difference between binder after curing and particle $\Delta \phi$: Phase difference between binder component after curing and particle $\lambda$: Measured wavelength $d$: Average particle diameter of particle after curing The average particle diameter of the particles after curing calculated from the above method was within the range from 1.5 to 8.0 μm.

In Examples 4 and 5, and Comparative examples 1 and 2, the silica fine particles used were amorphous inorganic fine particles, so that those particles were hardly affected by the solvent and monomer. Thus, the refractive index after curing was not changed. Therefore, the refractive index difference was calculated from measuring only the refractive index of the hard coat layer after curing in accordance with B method of the method for measuring the refractive index of plastic defined in JIS K7142 (1996).

(Measurement of Arithmetic Mean Roughness (Ra))

The arithmetic mean roughness (Ra) was measured by using SE-3400 (product name; manufactured by: Kosaka Laboratory Ltd.) according to JIS B0601 (1994). The result of Ra shown in Tables 1 and 2 is the average value measured by three measurements.

(Measurement of Height of Convex Portion, Number and Average Value)

The height of the convex portions in the 1.08 mm square area was measured by using New View 6000 (product name; manufactured by: Zygo Corporation).

The number of the convex portions was calculated by counting the number of peaks of the convex portions in the 1.08 mm square area.

Eight cross-sectional surfaces of a convex portion were created by cutting the convex portion at every 22.5°, centering around the peak of the same (see FIG. 11), and height h of each cross-sectional surface was obtained by the formula: h="the height of the peak"−"the height of the deepest valley" (see FIG. 12). Then, the average value of the height h was defined as the height of the convex portions. The minimum and maximum values of the height of the convex portions in the 1.08 mm square area are shown in Tables 1 and 2.

Then, the number of the convex portions each having a height of 0.3 to 3 μm in the area, and the average number of the convex portions per square containing the convex portions when the area were divided into 100 parts to form 100 squares were measured.

(Measurement of Transmission Image Clarity)

The transmission image clarity was expressed as a sum of numerical values measured with four types of optical comb (0.125 mm, 0.5 mm, 1 mm and 2 mm) by means of an image clarity meter (product name: ICM-1PD; manufactured by: Suga Test Instruments Co., Ltd.) according to the measurement of image clarity defined in JIS K7105 (2006). The transmission image clarity was higher as the numerical value was higher. The maximum value of the transmission image clarity was 400.

(Measurement of Haze)

The haze of the optical film was measured by means of a haze meter (product name: HM-150; manufactured by: Murakami color research laboratory) according to JIS K-7136.

(Evaluation of Effect of Preventing Glare)

The obtained optical film was placed on a monitor (manufactured by: Apple Inc.; 15-inch LCD) with the surface side down, the surface having convex portions of the HC layer (A), and left in a bright room. Then, the monitor which emits white light was observed at a point 30 cm away from the panel, firstly from the front side. As shown in FIG. 10, the monitor was visually observed whether glare was formed or not with the body continuously moving in various directions at 45 degrees, including right, left, upper light, left below, etc., to the front side, and also with the direction of eyes changing without shifting the observing point. Then, the obtained results were evaluated based on the following criteria.

Evaluation Criteria

Evaluation ⊚: No glare was observed.

Evaluation ○: No glare was observed in the directions at 30 degrees of right-and-left viewing angles from the front side of the monitor. However, glare was observed in the direction at 45 degrees.

Evaluation x: Glare was observed in the directions at 30 degrees of right-and-left viewing angles from the front side of the monitor, and this was a poor evaluation.

(Evaluation of Effect of Preventing Newton Ring)

ITO was provided as the transparent electroconductive film on the surface having convex portions of the HC layer (A) of the optical film each obtained in Examples and Comparative examples. The optical film was placed on the liquid crystal display so as to contact the ITO side of the optical film, and was pressed with fingers from the optically-transparent substrate side. The formation of Newton ring was evaluated as mentioned below. Evaluation "3" or more is good.

Evaluation 5: No Newton ring was formed even when the optical film was pressed firmly.

Evaluation 4: Newton ring may be slightly formed when the optical film was pressed firmly.

Evaluation 3: No Newton ring was formed when the optical film was pressed normally.

Evaluation 2: Newton ring was formed in some parts when the optical film was pressed normally.

Evaluation 1: Newton ring was formed when the optical film was pressed normally.

Evaluation 0: Newton ring was notably formed when the optical film was pressed normally.

"press firmly" means that the load about 49 to 59N is applied on the optical film with both of thumbs at intervals of about 3 cm. For example, if the area contacted by the thumbs is 4 cm$^2$, the pressure is about 120 to 150 kPa.

"press normally" means that the load about 14.7 to 19.6N is applied on the optical film with both of thumbs at intervals of about 3 cm. For example, if the area contacted by the thumbs is 4 cm$^2$, the pressure is about 40 to 50 kPa.

The reason why the evaluation was conducted with both of thumbs is that Newton ring is hardly observed by just pressing one finger, but Newton ring is easily observed by looking at the space between two fingers.

Results of Examples and Comparative Examples

In Examples conducted under the condition of the present invention, prevention of Newton ring formation and glare were both excellent.

To the contrary, in Comparative example 1, Newton ring formation was prevented. However, glare was observed, transmission image clarity was low, and haze was high. This is considered because, in Comparative example 1, the arithmetic mean roughness (Ra) of the HC layer was more than 0.05 μm.

In Comparative example 2, transmission image clarity was lower and haze was higher than those of Comparative example 1, and glare was observed. This is considered to be related to higher arithmetic mean roughness (Ra) of the HC layer than that of Comparative example 1, and large average number of the convex portions (3.1 per square).

In Comparative example 3, glare was prevented. However, Newton ring was notably formed. This is considered because the arithmetic mean roughness (Ra) of the HC layer was smaller (less than 0.025 μm) contrary to Comparative examples 1 and 2.

In Comparative example 4, glare was observed and Newton ring was notably formed. This is considered because Ra was 0.069 µm, which was more than 0.05 µm, and the number of the convex portions each having a height of 0.3 to 3 µm was 8, which was less than 10, so that the number of convex portions required for preventing Newton ring formation was not obtained.

In Comparative example 5, glare was prevented. However, Newton ring was notably formed. This is considered because Ra was 0.012 µm, which was less than 0.25 µm, and the number of the convex portions each having a height of 0.3 to 3 µm was 5, which was less than 10, so that the number of convex portions required for preventing Newton ring formation was not obtained.

REFERENCE SIGNS LIST 1, 2, 3 and 4: Optical film
5, 6, 7 and 9: Touch panel
8: Inner touch panel
10: Optically-transparent substrate
11: Second optically-transparent substrate
12: Retardation film
20 and 21: Transparent electroconductive film
30: Spacer
40: Conventional hard coat layer
41: Second hard coat layer
42: Third hard coat layer
50: Display side-surface of transparent electroconductive film
60: Input operation side-surface of second transparent electroconductive film
70: Stylus pen
80: Display
90: Hard coat layer (A)
100: Low refractive index layer
110: Anti-fouling layer
120: Outermost surface on input operation side of optical film
130: Polarizing plate
140: Liquid crystal cell
150: Conventional touch panel

The invention claimed is:

1. An optical film comprising an optically-transparent substrate and at least one hard coat layer (A) disposed on a surface of the optically-transparent substrate, wherein a surface of the hard coat layer (A), which is opposite to a surface where the optically-transparent substrate is present, has an arithmetic mean roughness (Ra) defined in JIS B0601 (1994) of 0.025 to 0.05 µm, and has 10 to 250 convex portions each having a height of 0.3 to 3 µm in a 1.08 mm square area, and wherein the hard coat layer (A) has a laminated thickness of 2.5 to 6.5 µm, and the optical film has a haze of 0.1 to 1.0%.

2. The optical film according to claim 1, wherein when said area is uniformly divided into 100 parts to form 100 squares, an average number of the convex portions per square containing the convex portions is less than 2.5.

3. The optical film according to claim 1, having a transmission image clarity defined in JIS K7105 (2006) of 180 to 310.

4. The optical film according to claim 1, wherein the hard coat layer (A) is a cured product of a curable resin composition for a hard coat layer, the composition comprising 0.05 to 1.5 parts by weight of particles with respect to 100 parts by weight of a binder component; the particles has an average particle diameter of 1.5 to 8 µm; and a refractive index difference between the particles and the binder component after curing is 0.07 or less.

5. The optical film according to claim 1, wherein a transparent electroconductive film is provided on or above the surface of the hard coat layer (A), which is opposite to the surface where the optically-transparent substrate is present.

6. A touch panel comprising the optical film defined by claim 5, wherein a second transparent electroconductive film is further provided on the transparent electroconductive film side of the optical film.

7. A touch panel comprising the touch panel defined by claim 6 and a liquid crystal cell, wherein the touch panel of claim 6 is provided so that the second transparent electroconductive film side of the touch panel is located on the liquid crystal cell side, and a polarizing plate is provided on or above a surface of the optically-transparent substrate, which is opposite to the surface where the hard coat layer (A) is present.

* * * * *